H. OGBORN.

Fanning Mill.

No. 3,504. Reissued June 15, 1869.

N. PETERS. Photo-Lithographer. Washington. D. C.

United States Patent Office.

HARRISON OGBORN, OF RICHMOND, ASSIGNOR TO ELLIS MICHAEL, OF LAPORTE, INDIANA.

*Letters Patent No.* 70,885, *dated November* 12, 1867; *reissue No.* 3,504, *dated June* 15, 1869.

DIVISION B.

IMPROVEMENT IN FANNING-MILLS.

The Schedule referred to in these Letters Patent and making part of the same.

*To all whom it may concern:*

Be it known that I, HARRISON OGBORN, of Richmond, in the county of Wayne, and State of Indiana, have invented new and useful Improvements in Fanning-Mills. I hereby declare the following to be a full, clear, and correct description of the same, sufficient to enable others skilled in the class to which my invention appertains, to fully understand and use the same, reference being had to the accompanying drawings, which make a part of this specification, and in which—

Figures 1, 2, 3, and 4, are detached views of my improved devices.

The nature of my invention consists in a new and novel mode of imparting a quick vibratory motion to the shoe of a fanning-mill, thereby producing a more perfect separation in cleaning grain and seeds, and especially in separating oats from spring-wheat.

Figure 4:
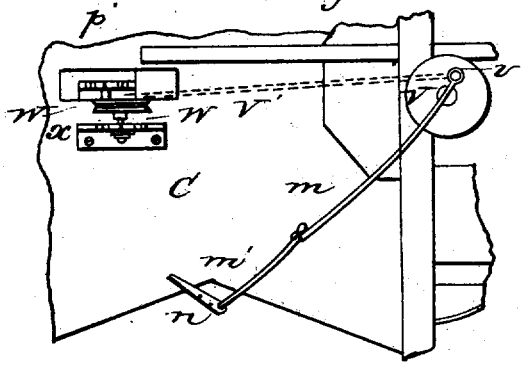

C, in fig. 4, represents a portion of the side of a fanning-mill, to which a stationary bracket, $x$, is attached, into which, and projecting upward, is a pin or spindle, on which a wheel, W, is made to play loosely by means of a hole in its centre.

Figure 1:
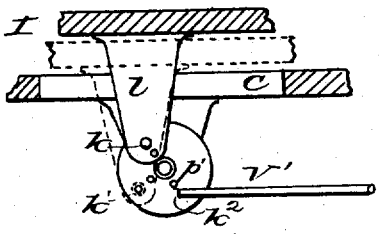
Figure 2:
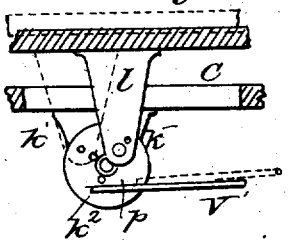
Figure 3:
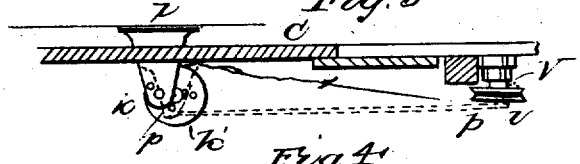

This wheel is provided with three sets of holes, running from the centre toward the circumference, as is fully shown at $k$ $k^1$ $k^2$ in figs. 1, 2, 3.

Rigidly attached to the shoe I is an arm, $l$, which has a pin projecting downward from near its outer end, which pin fits into the holes $k$.

V is a wheel, which is attached directly to the fan-shaft of a fanning-mill, provided with suitable means for the attachment of the rod V′, which rod is bent at the end which connects with wheel W, so that the bent part may be attached to the wheel by means of the holes $k^1$ or $k^2$.

The operation is as follows:

When it is desired to give the "shoe" the common or ordinary motion, of two vibrations of the "shoe" to one revolution of the wheel, the pin in the arm $l$ resting in the hole $k$, the bent end of the rod V′ is placed in hole $k^1$, whereby the "shoe" will receive two vibrations to each revolution of the wheel V, as is shown at figs. 1 and 3 by the different lines.

When it is desired to give the "shoe" a quicker motion without increasing the motion of the fan-shaft, it is only necessary to lift the end of the rod which attaches to the wheel W out of its place at $k^1$, and place it in the hole $k^2$, as shown in fig. 2, when each revolution of the fan-shaft will cause the pin on the arm $l$, which fits into the hole $k$, to perform the arc of a circle, thus forcing the "shoe" to move laterally four times to each revolution of the fan-shaft, thus producing the result desired.

Having thus described the nature, construction, and operation of my invention,

What I claim therein as new and useful, and desire to secure by Letters Patent, is—

The devices described, W, $k$, $k^1$, $k^2$, $l$, $x$, $p$, and V, for the purpose of imparting increased motion to the "shoe" of a fanning-mill, and which imparts four motions to the "shoe," to one revolution of the fan-shaft.

Witnesses: HARRISON OGBORN.

D. P. HOLLOWAY,

JAMES M. BLANCHARD.